Aug. 26, 1924.
L. L. JONES ET AL
1,506,304
BATTERY
Filed May 13, 1922
Fig. 1,
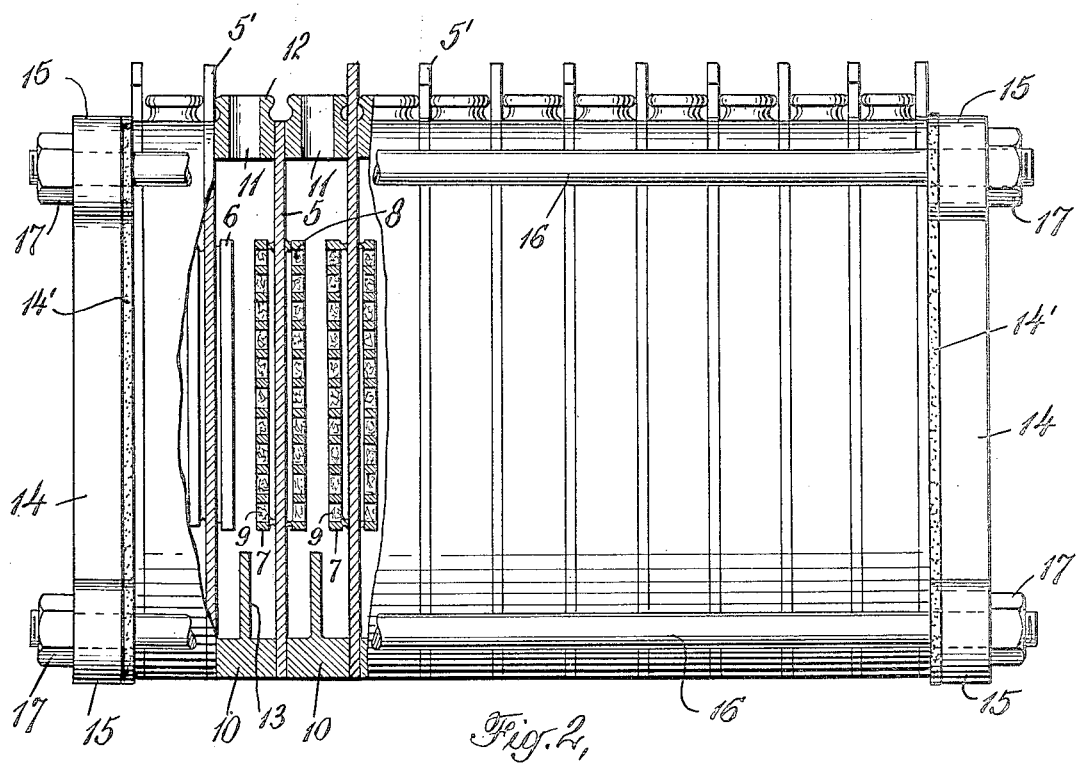
Fig. 2,
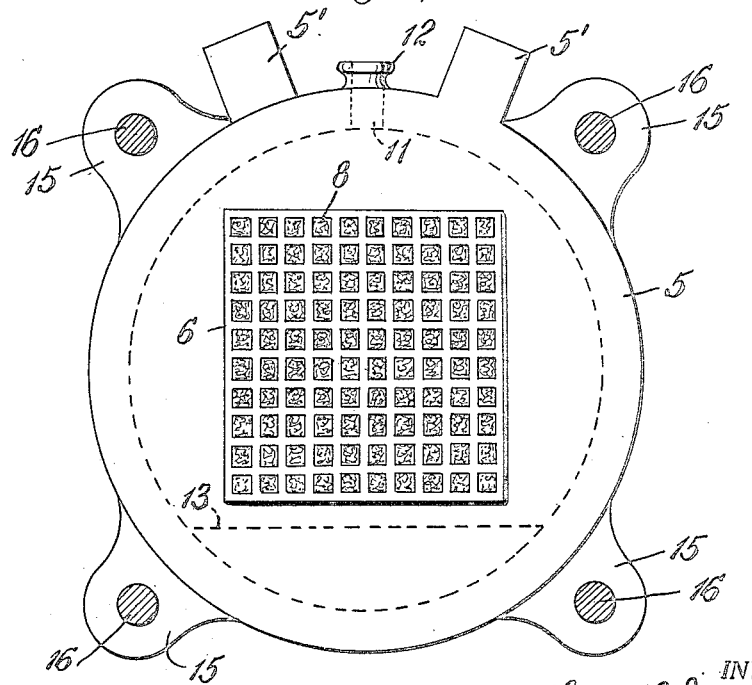
INVENTOR
Lester L. Jones and
BY Norman Dexter Stages
Pennie Davis Marvin & Edmonds
their ATTORNEYS Patented Aug. 26, 1924.

1,506,304

UNITED STATES PATENT OFFICE.

LESTER L. JONES, OF NEW YORK, AND NORMAN DEXTER STURGES, OF BELLEROSE, NEW YORK; SAID STURGES ASSIGNOR TO MULTIPLE STORAGE BATTERY CORPORATION.

BATTERY.

Application filed May 13, 1922. Serial No. 560,547.

*To all whom it may concern:*

Be it known that we, LESTER L. JONES, a citizen of the United States, residing at New York city, county and State of New York, and NORMAN DEXTER STURGES, a citizen of the United States, residing at Bellerose, county of Nassau, State of New York, have invented certain new and useful Improvements in Batteries; and we do hereby declare the following to be a full, clear, and exact description of the invention, such as will enable others skilled in the art to which it appertains to make and use the same.

This invention relates to electric batteries and particularly to secondary or storage batteries.

It is an object of the invention to provide a light, compact and relatively inexpensive battery having a large electrolyte space.

Another object of the invention is the provision of a cell unit which may be assembled with others of like construction to provide a battery of the desired capacity without external bus-bars or similar connections.

Another object of the invention is the provision of current outlets from each cell so that current at the desired voltage may be obtained readily by connecting with the selected outlets.

Another object of the invention is the provision of means serving the multiple purpose of cell walls, supports for the active plates and bus-bars between the adjacent cells in combination with spacers to provide for the electrolyte, these elements being assembled and held in such a manner as to prevent leakage of the electrolyte.

Further objects and advantages of the invention will be apparent as it is better understood by reference to the following specification and accompanying drawing, in which Fig. 1 is a longitudinal section through a battery embodying the invention; and Fig. 2 is a transverse section through the battery on the line 2—2 of Fig. 1.

Our invention depends primarily upon a divider of rolled sheet lead through which the electrolyte cannot pass and which supports on opposite sides the positive and negative plates of adjacent cells. In the preferred construction the dividers are circular and the plates consist of grids of suitable form burned to the dividers and pasted with the usual active material. The dividers are separated by annular spacers of suitable acid-resistant material such as hard rubber or celluloid composition to provide space for the electrolyte. Each pair of dividers, carrying respectively a positive and a negative plate on their adjacent faces, forms with the spacer a cell unit, two walls of which are formed by the lead dividers. When a plurality of these cells are assembled the dividers provide bus-bars connecting the adjacent cells in series. Each divider is preferably provided with a projecting tab or lug forming a current outlet, and by connecting with selected outlets, current at any voltage up to the capacity of the battery in multiples of the unit voltage may be obtained.

Referring to the drawing, 5 indicates a divider which, as stated, is constructed of rolled sheet lead and is preferably circular in form. To the opposite sides of the divider the positive and negative plates 6 and 7 are secured preferably by a lead-burning operation which ensures a unitary structure. The end dividers are, of course, provided with plates on one side only and of the proper character to complete the battery. The plates 6 and 7 consist of grids supporting the pasted active material 8 and 9. This material may be of any suitable composition, such materials being well known in the art. The dividers 5 are mounted between spacers 10 of hard rubber, celluloid composition or other suitable acid-proof insulating material which are preferably circular in form, thus conforming to the shape of the dividers. Each spacer is provided with an inlet 11 through which the electrolyte may be introduced, the inlet being preferably surrounded by a neck 12 to reduce the liability of spilling and creeping of the electrolyte. At the bottom of each spacer a partition 13 is formed so that any material falling from the grid is prevented from bridging and thus short-circuiting the plates. In assembling the dividers and spacers, they are preferably cemented with a suitable material such as rubber, celluloid, or asphaltum cement to insure forming a tight joint to prevent escape of the electrolyte. Tabs 5' on the dividers provide current outlets.

The assembled cells are supported between clamps 14 of suitable material having the requisite strength. If metal clamps are used, insulating sheets 14' are disposed between the clamps and the end dividers. The clamps are preferably annular in form and are provided with lugs 15 having openings to receive rods 16, the latter being threaded and provided with nuts or other fastening devices 17 whereby the assembled cells are firmly clamped together and held in assembled relation.

The battery thus formed is supplied with electrolyte such as sulphuric acid solution of requisite strength, and when charged, is ready for use. It will be observed that there are no containers of the usual kind employed in storage batteries, and the danger of breakage incident to the use of such containers is therefore eliminated. All of the elements of the battery may be stamped or molded with the exception of the rods and nuts, and the elements may be assembled without application of skilled labor other than that required to burn the active plate to the dividers. Much of the surplus weight of usual types of storage batteries is eliminated, and the structure is light and compact in relation to its capacity. The large electrolyte space permits use of the battery where frequent examination and replenishment of the electrolyte is undesirable or impossible. Current at the desired voltage within the capacity of the battery may be readily obtained, thus making the battery useful for laboratory and similar uses as well as for commercial applications where a light compact battery is desirable. The circular form of the dividers and spacers permits proper distribution of the pressure exerted by the clamping means with a minimum number of rods. Buckling of the dividers which would otherwise render the battery worthless is thereby avoided and the cost of construction of the battery is reduced.

Various changes may be made in the details of construction and arrangement of the parts without departing from the invention or sacrificing any of the advantages thereof.

We claim:

1. In a battery the combination of a plurality of assembled cell units, each consisting of an insulating spacer and dividers of rolled sheet lead forming the walls of the cell, active plates secured to the opposite sides thereof, the dividers serving as supports for the active plates and as electrical connections between the adjacent cells, and means for clamping the spacers and dividers in assembled relation, the spacers and dividers being circular in form whereby the pressure applied by the clamping means is equalized and buckling of the dividers is prevented.

2. In a battery the combination of a plurality of assembled cell units, each consisting of an insulating spacer and dividers of rolled sheet lead forming the walls of the cell, active plates burned to the opposite sides thereof, the dividers serving as supports for the active plates and as electrical connections between the adjacent cells, and means for clamping the spacers and dividers in assembled relation, the spacers and dividers being circular in form whereby the pressure applied by the clamping means is equalized and buckling of the dividers is prevented.

3. In a battery the combination of a plurality of assembled cell units, each consisting of an annular insulating spacer and dividers of rolled sheet lead cemented thereto at the abutting surfaces and forming the walls of the cell, active plates secured to the opposite sides thereof, the dividers serving as supports for the active plates and as electrical connections between the adjacent cells, and means for clamping the spacers and dividers in assembled relation.

4. In a battery the combination of a plurality of assembled cell units, each consisting of an annular insulating spacer and dividers of rolled sheet lead forming the walls of the cell, active plates secured to the opposite sides thereof, the dividers serving as supports for the active plates and as electrical connections between the adjacent cells and lugs on the dividers forming current outlets.

5. In a battery the combination of a plurality of assembled cell units, each consisting of an annular insulating spacer and dividers of rolled sheet lead cemented thereto and forming the walls of the cell, active plates secured to the opposite sides thereof, the dividers serving as supports for the active plates and as electrical connections between the adjacent cells and lugs on the dividers forming current outlets.

In testimony whereof we affix our signatures.

LESTER L. JONES.
NORMAN DEXTER STURGES.